(12) United States Patent
Cohen et al.

(10) Patent No.: US 7,965,708 B2
(45) Date of Patent: Jun. 21, 2011

(54) METHOD AND APPARATUS FOR USING META-PACKETS IN A PACKET PROCESSING SYSTEM

(75) Inventors: Earl T. Cohen, Fremont, CA (US); James Markevitch, Palo Alto, CA (US); Adrian Evans, Ottawa (CA); John Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 11/147,755

(22) Filed: Jun. 7, 2005

(65) Prior Publication Data

US 2006/0274773 A1  Dec. 7, 2006

(51) Int. Cl.
*H04L 12/28* (2006.01)

(52) U.S. Cl. ......... 370/389; 370/412

(58) Field of Classification Search .......... 370/394, 370/412, 398, 389, 413; 709/250; 712/201; 345/501
See application file for complete search history.

(56) References Cited

U.S. PATENT DOCUMENTS

| | | | | |
|---|---|---|---|---|
| 5,325,493 | A | * | 6/1994 | Herrell et al. ............. 712/201 |
| 5,337,410 | A | * | 8/1994 | Appel ...................... 345/501 |
| 5,396,490 | A | | 3/1995 | White et al. |
| 5,469,433 | A | | 11/1995 | McAuley |
| 5,548,593 | A | | 8/1996 | Peschi |
| 5,809,024 | A | | 9/1998 | Ferguson et al. |
| 5,920,572 | A | | 7/1999 | Washington et al. |
| 5,936,939 | A | | 8/1999 | Des Jardins et al. |
| 5,949,780 | A | | 9/1999 | Gopinath |
| 5,956,341 | A | | 9/1999 | Galand et al. |
| 5,974,518 | A | | 10/1999 | Nogradi |
| 6,032,190 | A | | 2/2000 | Bremer et al. |
| 6,044,061 | A | | 3/2000 | Aybay et al. |
| 6,064,651 | A | | 5/2000 | Rogers et al. |
| 6,064,676 | A | | 5/2000 | Slattery et al. |
| 6,076,117 | A | | 6/2000 | Billings |
| 6,160,651 | A | | 12/2000 | Chang et al. |
| 6,160,812 | A | | 12/2000 | Bauman et al. |
| 6,259,699 | B1 | * | 7/2001 | Opalka et al. ............ 370/398 |
| 6,473,435 | B1 | | 10/2002 | Zhou et al. |
| 6,498,667 | B1 | | 12/2002 | Masucci et al. |
| 6,608,813 | B1 | | 8/2003 | Chiussi et al. |

(Continued)

FOREIGN PATENT DOCUMENTS

EP  1050181  7/1999

(Continued)

OTHER PUBLICATIONS

Xu et al., Techniques for optical packet switching and optical burst switching, IEEE Communications Magazine, Jan. 2001, pp. 136-142, v. 39, issue 1, New York, U.S.A. (http://www.comsoc.org/ci/private/2001/jan/pdf/xu.pdf).

(Continued)

*Primary Examiner* — Derrick W Ferris
*Assistant Examiner* — Gbemileke Onamuti
(74) *Attorney, Agent, or Firm* — Stolowitz Ford Cowger LLP

(57) ABSTRACT

Meta-packets are used to more efficiently reassemble packets and to more efficiently conduct other packet processing operations. The meta-packets are special types of packets which are interpreted by hardware in a queuing system. Instead of directly containing data, the meta-packet packets contain instructions for building a desired packet from various identifiable storage locations in the packet processor system. Because the reassembled packet replaces the meta-packet, packet ordering is preserved.

44 Claims, 6 Drawing Sheets

U.S. PATENT DOCUMENTS

| | | |
|---|---|---|
| 6,646,985 B1 | 11/2003 | Park et al. |
| 6,661,794 B1 | 12/2003 | Wolrich et al. |
| 6,661,801 B1 | 12/2003 | Richards et al. |
| 6,731,638 B1 | 5/2004 | Ofek |
| 6,735,219 B1 | 5/2004 | Clauberg |
| 6,744,741 B1 | 6/2004 | Ju et al. |
| 6,778,536 B1 | 8/2004 | Ofek et al. |
| 6,957,018 B2 | 10/2005 | Araki et al. |
| 7,304,996 B1* | 12/2007 | Swenson et al. .............. 370/394 |
| 7,480,308 B1 | 1/2009 | Cohen et al. |
| 2002/0021707 A1* | 2/2002 | Sampath et al. .............. 370/412 |
| 2002/0027907 A1 | 3/2002 | Tateoka |
| 2002/0099915 A1 | 7/2002 | Takada et al. |
| 2004/0179487 A1 | 9/2004 | Matsugatani et al. |
| 2005/0041970 A1 | 2/2005 | Harai |
| 2006/0008273 A1 | 1/2006 | Xue et al. |
| 2006/0106946 A1* | 5/2006 | Agarwal et al. ................ 709/250 |

FOREIGN PATENT DOCUMENTS

| | | |
|---|---|---|
| EP | 1085723 | 3/2001 |

OTHER PUBLICATIONS

European Search Report for PCT/US2006/013986; Apr. 28, 2010.

* cited by examiner

METHOD AND APPARATUS FOR USING META-PACKETS IN A PACKET PROCESSING SYSTEM

BACKGROUND

In many packet processing systems, packets are stored in buffers in order to provide queuing to handle bursts of traffic, to provide preferential scheduling for some classes of traffic, etc. There have been two main paradigms for such packet storage: full packet, or some type of scatter/gather where a packet is represented as one or more pointers to the pieces of the packet. The full packet storage approach has some large advantages in simplicity. However, the scatter/gather approach may be more bandwidth efficient in some cases where only a portion of the packet needs to be accessed, or where the packet is received (or transmitted) in pieces (fragmented) and must then be reassembled.

Even in the full-packet system, there is a need for reassembly of packet fragments due to protocols such as Multilink Point to Point Protocol (MLPPP), Link Fragmentation and Interleaving (LFI), and Frame Relay Forum (FRF) Implementation FRF.12. In both the full-packet and the scatter-gather systems, the packet re-assembly techniques used for implementing these protocols have limited scalability.

For example, in systems that store full packets, only a portion of the packet may be available at any one time or different fragments may arrive in arbitrary orders. When fragments are eventually dequeued, the different portions of the same packet must then be put back together. A large amount of processor bandwidth is required for dynamically tracking and accessing the different pieces of data that make up the reassembled packet.

Thus a need remains for improving the efficiency in which packet-pieces are reassembled into full packets. The present invention addresses this and other problems associated with the prior art.

SUMMARY OF THE INVENTION

Meta-packets are used to more efficiently reassemble packets and to more efficiently conduct other packet processing operations. The meta-packets are special types of packets which are interpreted by hardware in a queuing system. Instead of directly containing data, the meta-packet packets contain instructions for building a desired packet from various identifiable storage locations in the packet processor system. Because the reassembled packet replaces the meta-packet, packet ordering is preserved. For example, assuming the meta-packet was in the proper place in a packet sequence, the packet (or packets) replacing the meta-packet will also be maintained in the same packet sequence order. Both meta-packets and conventional packets can be processed using the same queues and queuing system, and can be freely intermixed allowing co-existence of reassembled and full packets. The meta-packets provide packet re-assembly capability to full-packet systems and increase scalability for both full-packet or scatter-gather systems.

The meta-packets can be used for conducting other packet processing operations either separately or in combination with packet re-assembly. For example, the meta-packets can be used to help manage packet queuing operations, provide timing references, and to initiate other packet processing operations and commands.

The foregoing and other objects, features and advantages of the invention will become more readily apparent from the following detailed description of a preferred embodiment of the invention which proceeds with reference to the accompanying drawings.

DETAILED DESCRIPTION

Figure 1:
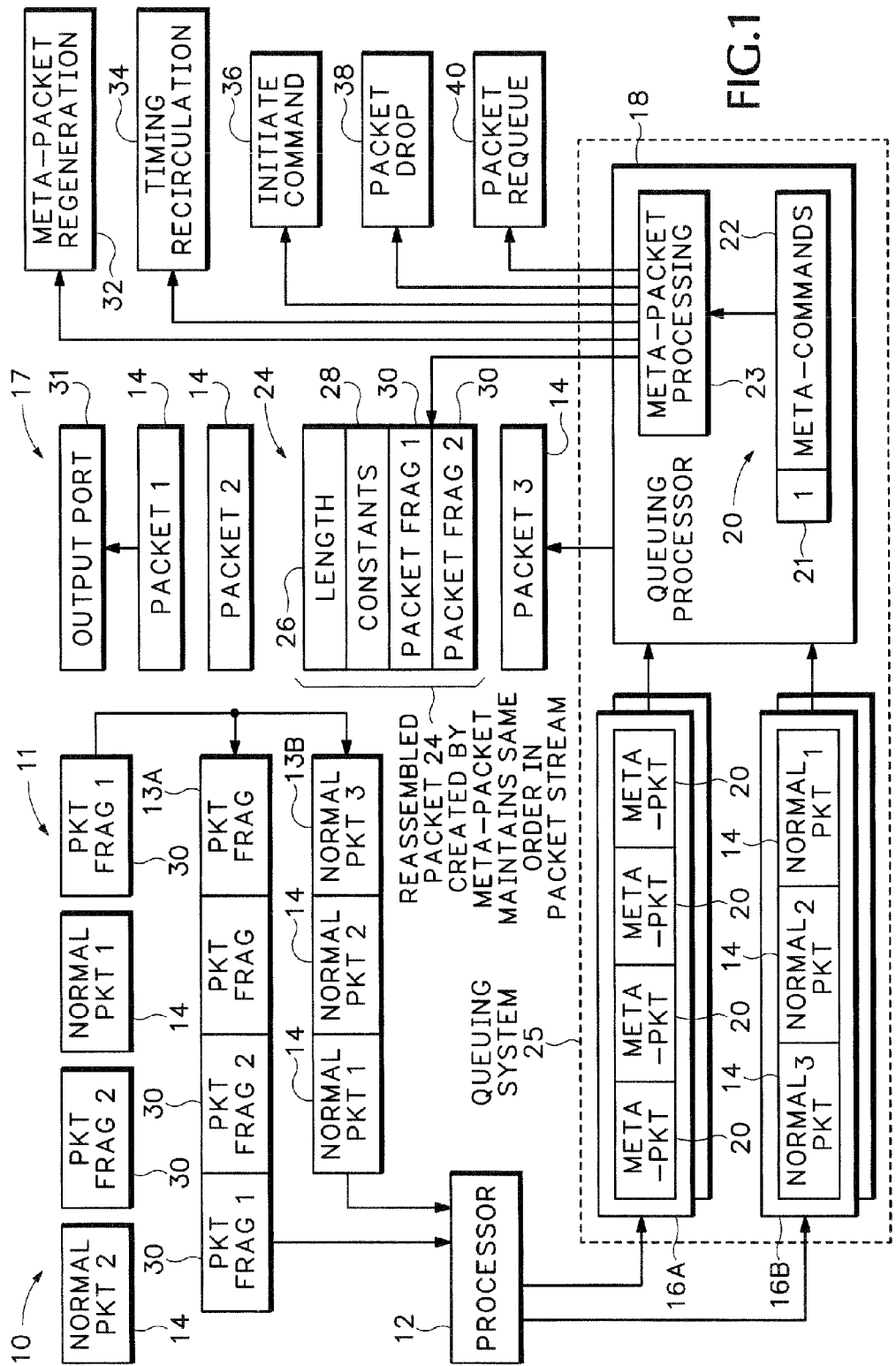
FIG. 1 is a diagram showing how meta-packets are used for reassembling packets.

FIG. 1 shows a packet processing system 10 that uses meta-packets 20 to more efficiently conduct certain packet processing operations. The packet processing system 10 can be utilized for any network processing device, such as a router, switch, gateway, server, personal computer, etc. used for processing packets. In this example, a packet stream 11 is received by the packet processing system 10. The packet stream 11 can include both normal packets 14 and packet fragments 30. An initial processing stage stores the normal packets 14 into buffers 13B and stores the packet fragments 30 in a buffer 13A.

Conventional packets 14 are any normal data or control packet that may typically include a packet header and a packet payload. For example, the conventional packets 14 may be Internet Protocol (IP) packets or any other type of network packet. References made below to normal packets, conventional packets, data packets, control packets, or network packets in general refer to any packet that is capable of being transported over a packet switched network and all forms and transformations of these packets while being processed in a packet processing system.

The packet fragments 30 are typically portions of one or more packets such that all portions of a given packet will (eventually) appear in the packet stream. In some implementations, there may be multiple packet streams 11, and packet fragments from the same packet may be distributed among the multiple packet streams. In cases such as this, there may be one buffer 13A per packet stream.

A processor 12 in the packet processing system 10 sends the normal packets 14 to a first packet buffer 16B in a queuing system 25. In this example, the processor 12 generates meta-packets 20 that identify the packet fragments 30 in buffer 13A. The meta-packets 20 are sent to a second buffer 16A in the queuing system 25.

The meta-packets 20 contain embedded meta-commands 22 used in one application for re-assembling (gather the pieces of) fragmented normal packets 30. Other embedded meta-commands 22 can be used for performing other data manipulation, re-assembly and control operations. The meta-packet 20 causes the reassembly of a normal packet 24 which then replaces the meta-packet 20 in an output data stream 17. In this example, the meta-packet 20 acts like an indirect reference to a normal packet, which may be in multiple pieces. The reassembled packet 24 inherently maintains the same order in the packet stream previously maintained by meta-packet 20. Thus, no special packet ordering operations have to be performed for the reassembled packet 24 created from meta-packet 20. This is particularly beneficial for protocols such as MLPPP which intermix regular packets and reassembled packets in their output streams.

To explain further, the normal packets 14 are enqueued in packet queue 16B and the meta-packets 20 are enqueued in different control or packet data queues 16A in queuing system 25. In one example, some of the queues 16 may be First In-First Out (FIFO) type buffers. The meta-packets 20 and the normal packets 14 sit in packet queues 16A and 16B while waiting to be further processed or de-queued by a queuing processor 18. The queuing processor 18 may send the packets 14 and 24 back to different memory or processing elements in the packet processing system 10 for further processing or may send the packets 14 and 24 to different external ports. For example, packets 1, 2 and 3 and reassembled packet 24 are all shown being output to an output port 31 by the queuing processor 18.

The meta-packets 20 are distinguished from the conventional packets 14 by a bit (or a field) in a packet header 21. The knowledge that a packet is a meta-packet 20 can also be indicated by some other means, including out-of-band signaling. The meta-packet 20 is processed in the same manner as any other packet 14 until it gets to a certain point in the packet processing system 10. Generally the meta-packets 20 are distinguished from the conventional packets 14 in the egress queuing stage in the queuing system 25 after packets are aggregated by a scheduler. Of course, the meta-packet operations described below can also be initiated at other stages in the packet processing system 10.

The queuing system 25 detects the meta-packet 20 according to the flag in packet header 21. Instead of conducting normal packet operations, such as providing packet transfers, the queuing system 25 uses meta-packet processing 23 to interpret and execute meta-commands 22 that are contained in meta-packet 20. The meta-commands 22 can cause the queuing processor 18 to produce the reassembled packet 24 or to perform other packet processing operations that are not typically performed by the queuing system 25. For example, the meta-commands 22 may be used for meta-packet regeneration 32, timing recirculation 34, command initiation 36, packet dropping 38, and packet re-queuing 40. These exemplary operations are all described in more detail below.

The meta-packet 20 in the packet reassembly application effectively operates as a pointer to one or more packets or packet fragments. For example, the meta-packet 20 contains meta-commands 22 that point to different packet or packet fragments 30 currently stored in the packet processing system 10. The meta-commands 22 can also cause the queuing processor 18 to load other information into the reassembled packet 24, such as, packet length information 26 and other constants 28. The reassembled packet 24 created by meta-commands 22 then replaces the meta-packet 20 in the output packet stream 17. Thus, as mentioned above, the reassembled packet 24 automatically maintains a same relative position in the packet stream 17 processed by the queuing system 25.

Figure 4:
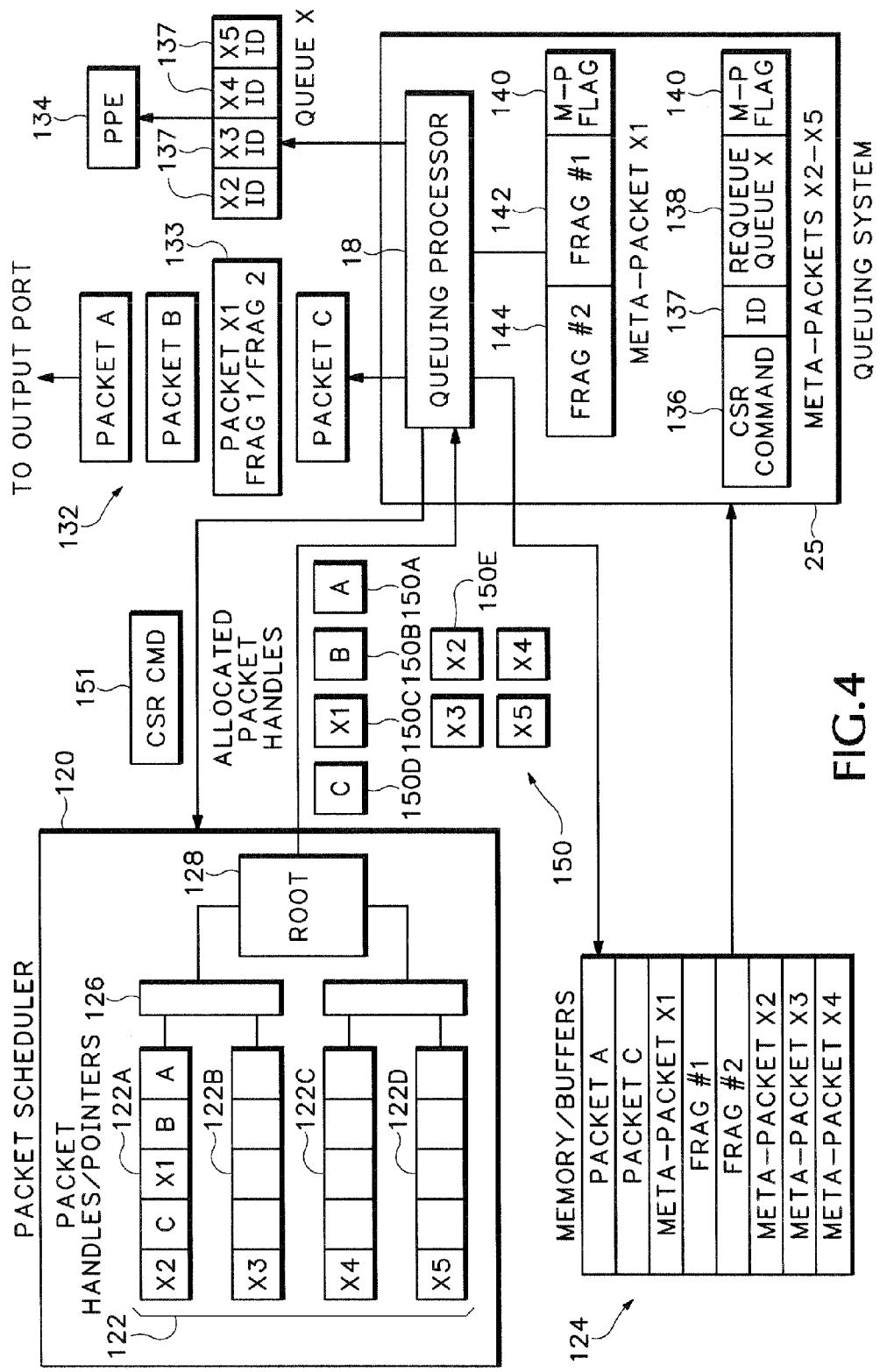
FIG. 4 is a diagram showing how meta-packets are used for flushing queues in a packet scheduler.

The queuing system 25 essentially executes commands from the meta-packet 20 to remove packets from the heads of queues 16 in the proper order under the control of a scheduler 120 (see FIG. 4). The meta-packet 20 in this example is a micro-sequence of similar commands provided by software that are executed in order by the queuing processor 18. While the meta-commands 22 in meta-packet 20 are similar to the "instructions" that remove normal packets from queues for transmission, the meta-commands 22 can be extended in several ways as described further below.

Figure 2:
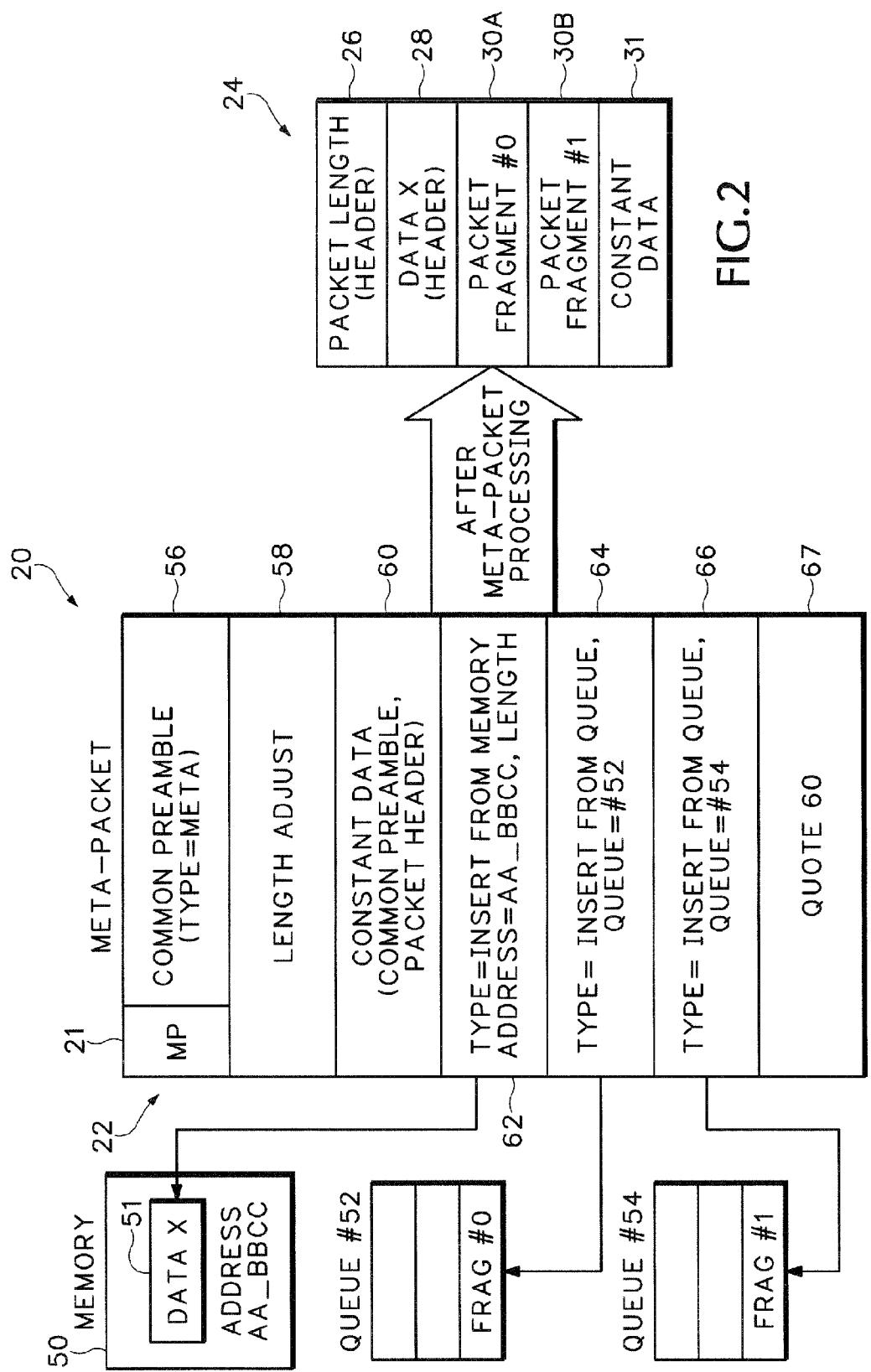
FIG. 2 is a block diagram showing one example of a meta-packet.

FIG. 2 shows one example of some meta-commands 22. The meta-packet 20 includes a common preamble 56 that contains the flag or bit in packet header 21 that identifies the packet as a meta-packet to the queuing processor 18 (FIG. 1). The meta-commands 22 can include a length adjust command 58 that causes the queuing processor 18 to determine the length of the reassembled packet 24 and insert this length information, possibly modified as specified in the length adjust command, into a common preamble or header 26, or into any other portion of the reassembled packet. A packet command 60 causes the queuing processor 18 to insert a constant contained in command 60 into the reassembled packet 24. The constant can be used in combination with the length adjust meta-command 58 to form a Media Access Control (MAC) header or other header or trailer information 26.

The meta-packet commands 22 as described above also allow packet re-assembly operations from several different disparate queues and memory elements. For example, a packet or other data 51 may be contained in memory 50. Other packet data may reside in packet queues 52 and 54. For example, additional header information (Data X) for the reassembled packet 24 may reside in memory 50, a first packet fragment #0 may reside in packet queue 52, and a second packet fragment #1 may reside in packet queue 54.

The meta-command 62 directs the queuing processor 18 to insert the contents of memory 50 at address AA_BBCC into header field 28 (or more precisely, in to the next sequential portion) of the reassembled packet 24. The meta-command 62 can also include a length field that indicates how much data should be read starting at the identified address location. Meta-commands 64 and 66 then direct the queuing processor 18 to insert the packet fragments #0 and #1 from packet queues 52 and 54, respectively, into locations 30A and 30B of reassembled packet 24.

The meta-packet pointers 62, 64, and 66 effectively "gather" and reassemble desired packets and data from multiple, disparate memory structures, such as from memory 50 and different packet queues 52 and 54. This can be used to support MLPPP or other similar protocols that create fragmented packets. While preferentially, for implementation simplicity, meta-commands such as these build the reassembled packet sequentially, another embodiment lets each meta-command specify the location in the reassembled packet to which it refers. In this embodiment, another type of meta-command might specify the "background" pattern for any locations not otherwise filled in by the reassembly processing of the meta-commands.

A quote meta-packet command 67 causes the queuing system 25 to take a part of the existing meta-packet 20 and copy it into the new packet 24. In this example, the quote command 67 directs the queuing system 25 to copy the constants from meta-command 60 into the packet 24. However, the quote command 67 can also be used for copying any of the same meta-commands 56-67 into packet 24. For example, the quote meta-command 67 can literally copy any of the insert commands 62-66, length adjust command 58, etc. into packet 24. The quote command 24 may be used, for example, to generate additional meta-packets as will be described below in FIGS. 5 and 6.

Creating Meta-Packets

Figure 3:
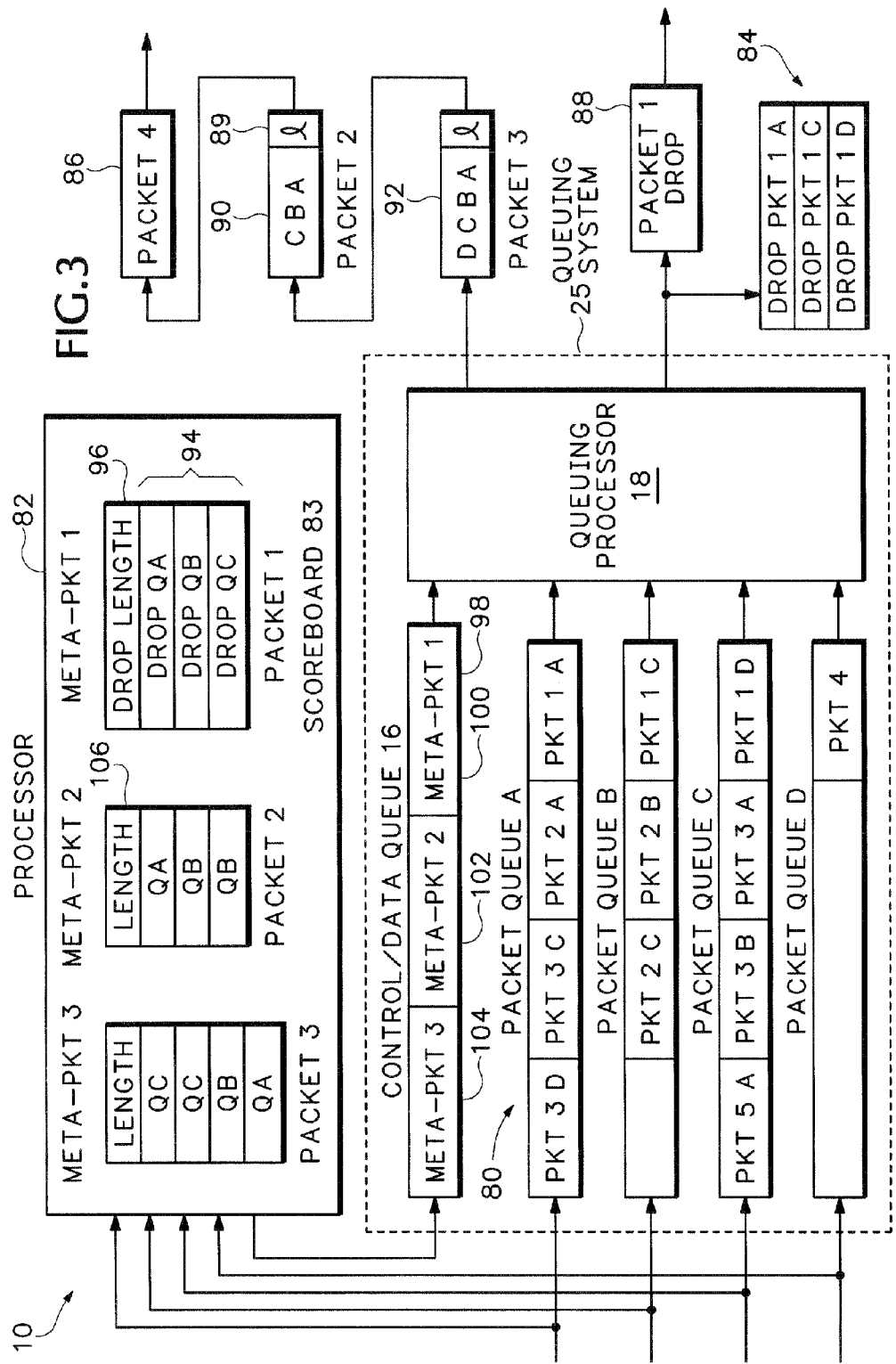
FIG. 3 is a diagram showing how the meta-packets are generated and used for assembling and dropping packets in packet queues.

FIG. 3 shows in more detail one example of how meta-packets are generated and used for reassembling packets, dropping packets and maintaining packet priority. Multiple different packets and/or packet fragments are received by the queuing system 25 into different packet queues 80.

In this example, a first packet queue A currently contains a first packet fragment for packet 1 (pkt 1-A), a first packet fragment for a second packet (pkt 2-A), a third packet fragment for a third packet (pkt 3-C), and a fourth packet fragment for a third packet (pkt 3-D). A packet queue B contains the third fragment for packet 1 (pkt 1-C), the second packet fragment for the second packet (pkt 2-B), and the third packet fragment for the second packet (pkt 2-C). A packet queue C contains the fourth fragment for the first packet (pkt 1-D), the first and second fragments for the third packet (pkt 3-A, pkt 3-B), and a first fragment for a fifth packet (pkt 5-A).

A processor 82 monitors the arrival of the different packets 1-5 into packet queues 80 and maintains a scoreboard 83 that tracks which packets and packet fragments are located in which packet queues 80. The processor 82 also determines that a received packet 4 in a separate high priority packet queue D is a high priority packet. This can be detected based on Quality of Service (QoS) information contained in the header of packet 4.

The scoreboard 83 lists the order that the packet queues 80 need to be read by the queuing processor 18 in order to properly reassemble the packet fragments. For example, to correctly reassemble the fragments for packet 2, queuing processor 18 needs to first read pkt 2-A from queue A, pkt 2-B from queue B, and pkt 2-C from queue B. With this knowledge, processor 82 forms a meta-packet 2 from the scoreboard 83 that lists queue A, queue B and queue B in sequential order.

The control processor 82 may also include an update length meta-command 106 in meta-packet 2, as well as other commands to produce a correctly formatted reassembled packet. The update length command 106 causes the queuing processor 18 to identify the overall length of reassembled packet 2 and insert the identified packet length 89 in the reassembled packet 88. A similar meta-packet 3 is formed for the packet fragments pkt 3-A, pkt 3-B, pkt 3-C, and pkt 3-D for packet 3.

Packet Priority

Another feature of the meta-packets is the ability to operate in conjunction with QoS services provided by the packet processor 10. For example, the high priority packet 4 is queued in a packet queue D different from the packet queues A, B, and C used for buffering fragmented packets. The queuing processor 18 can output packet 4 in position 86 of the output packet stream prior to outputting other packets 1, 2, and 3 that have to be reassembled from packet fragments.

In another embodiment, the processor 82 may locate the actual contents of high priority packet 4 directly into the control/data queue 16 as soon as it is received. In this example, the high priority packet 4 may be located in front of meta-packets 1, 2, and 3 in the control/data queue 16.

Packet Drops

The processor 82 would normally form a meta-packet for packet 1 similar to the meta-packets for packets 2 and 3. However, in this example, the second packet fragment pkt 1-B for packet 1 is never received in packet queues 80, or is not received within some predetermined time period. This can happen, for example, when the packet fragment pkt 1-B is dropped or lost while being transmitted over the Internet. The processor 82 may have a timer that waits some predetermined period of time for packet fragment pkt 1-B to arrive in packet queues 80. After the time-out period has expired, the processor 82 determines that all the other received packet fragments for packet 1 should be dropped.

Accordingly, a meta-packet 1 is constructed by the processor 82 to efficiently drop the packet fragments pkt 1-A, pkt 1-C, and pkt 1-D from packet queues A, B and C respectively. For example, instead of containing insert meta-commands, meta-packet 1 contains drop meta-commands 94 that direct the queuing processor 18 to read and discard the incomplete set of packet fragments for packet 1 from packet queues 80.

The processor 82 may also include a drop length identifier meta-command 96 that is then used to notify a processing device in the packet processor 10 that packet 1 has been dropped and that also identifies the amount of data in packet 1 that has been dropped. This can be used for supporting statistical analysis operations in the packet processor 10. This drop information could, in one embodiment, be sent to a processor via some type of FIFO. In this example, meta-packet 1 with the drop commands 94 also constructs a small control packet 88 containing the drop length and other information, and forwards this packet via a separate queue to the processor.

Meta-Packet Processing

The queuing processor 18 reads the meta-packets and normal packets in control/data queue 16 in sequential order starting from position 98. After outputting the high priority packet in packet queue D, the queuing processor 18 reads the meta-packet 1 from control/data queue 16. As described above, meta-packet 1 contains a first command that directs the queuing processor 18 to drop the next packet in packet queue A. A second meta-command in meta-packet 1 directs the queuing processor 18 to drop the next packet in packet queue B and a third meta-command directs the queuing processor 18 to drop the next packet in packet queue C. Accordingly, the queuing processor 18 reads and drops the packet fragments 84 for packet 1 from packet queues A, B and C.

As mentioned above, the meta-packet 1 can also include another meta-command 96 that directs the queuing processor 18 to identify the amount of data that was dropped and possibly includes header information associated with dropped packet 1. For example, the packet 88 may be sent to an independent destination from the other packets in this stream that is used for statistical analysis. The queuing processor 18 can easily identify the amount of dropped data by tracking the amount of data read when executing the commands in meta-packet 1.

After completing the meta-instructions for meta-packet 1, the queuing processor 18 reads the next meta-packet 2 in queue 16. Meta-packet 2 directs the queuing processor to read the next data element from packet queue A (pkt 2-A), then the next two data elements from packet queue B (pkt 2-B, pkt 2-C). The fragments pkt 2-A, pkt 2-B, and pkt 2-C are then reassembled and output as reassembled packet 88 by the queuing processor 18. As also mentioned above, meta-packet 2 may also include a length update meta-command 106 that causes the queuing processor 18 to derive and include length information for the reassembled packet 90. The queuing processor 18 accordingly places the packet length value 89 into the reassembled packet 90. This also is easily determined by the queuing processor 18 by keeping track of the amount of data read from packet queues 80 while executing meta-packet 2. In some embodiments, the length update meta-command 106 might insert a modified (shifted, rounded, with an offset added, etc.) version of the length in to reassembled packet 90. The queuing processor 18 then reassembles and outputs a packet 92 that contains all of the packet fragments for packet 3.

Queue Flushing and CSR Commands

Referring to FIG. 4, a scheduler 120 contains queues 122 that contain packet handles or pointers that identify locations of packets contained in memory and/or buffers and/or queues 124. The memory and/or buffers and/or queues 124 are referred to below generally as memory 124. The scheduler 120 may contain multiple different queues 122A-122D that are processed through multiple scheduling layers 126 and 128. The packet handles in the queues 122 propagate through the different scheduling layers until they eventually reach a root layer 128. The packet handle output from the root layer 128 identifies the next packet in memory 124 that is read by the queuing processor 18 for outputting either back to the packet processing system for additional processing or for outputting to an output port. The meta-packets can be used equally effectively in the scheduler scatter/gather architecture shown in FIG. 4.

In this example, queue 122A contains packet handles for packets A, B, a meta-packet X1, and packet C. In order to determine when the queues 122 are completely empty, a packet processor, such as processor 82 in FIG. 3, sends meta-packets X2, X3, X4 and X5 to each of queues 122A, 122B, 122C and 122D, respectively. The packet handles before each of meta-packet handles X2, X3, X4 and X5 in queues 122A, 122B, 122C and 122D, respectively, are then processed through by the packet scheduler 120 and queuing system 25.

For example, the packet handles 150A and 150B for packets A and B, respectively, are sent to the queuing processor 18 which then reads the corresponding packets A and B from memory 124. The queuing processor 18 then receives the packet handle 150C that identifies meta-packet X1 in memory 124. The queuing processor 18 reads data from memory 124 corresponding with packet handle 150C and determines the data is a meta-packet by detecting meta-packet flag 140. The meta-packet X1 includes meta-commands 142 and 144 that direct the queuing processor 18 to read packet fragments #1 and #2, respectively, from memory 124. The two packet fragments #1 and #2 are reassembled into a packet 133 that is then sent in this example to an output port along with packets A, B and C.

As described above, packet handles for meta-packets X2-X5 are each loaded into the different queues 122A-122D, respectively. When allocated by scheduler 120, the queuing processor 18 reads meta-packet X2 from the location in memory 124 identified in associated packet handle 150E. The meta-packet X2 is again identified as a meta-packet by flag 140. The meta-packet X2 contains a re-enqueue meta-command 138 that directs the queuing processor 18 to send the resulting contents created by meta-packet X2 to a control queue X, rather than the normal operation of replacing the meta-packet in the normal output stream with the packet it creates.

In one example, the queuing processor 18 generates an identifier packet 137 by executing meta-commands 137 in the meta-packet X2. The identifier packet 137 is directed to a control queue X by meta-command 138. The identifier packet 137 in control queue X provides a notification to a Packet Processing Element (PPE) 134 that contents in queue 122A prior to meta-packet X2 have now been dequeued. The identifier packet might be created in any number of ways, such as being constant data in the meta-packet, or through commands which read data from memory or packets/fragments from queues, etc.

Similarly, the meta-packets X3, X4 and X5 read from memory 124 also direct the queuing processor 18 to send identifier packets 137 to the same control queue X. In this example, when four packet identifiers 137 are received in control queue X, the PPE 134 knows that all of the data prior to the meta-packets X2-X5 is now flushed from the queues 122. This can be a trigger for the PPE 134 to then reconfigure the queues 122 for other operations. In some embodiments, the multiple identifier packets 137 might be constructed identically; in others, they might be different to indicate which queue they are associated with.

In another aspect of the queue flushing application, one or more of the meta-packets X2-X5 may contain a meta-command 136 that causes the queuing processor 18 to issue a Command Status Register (CSR) command 151. In this way, the meta-commands can instruct the queuing system 25 to perform other system operations, such as Command Status Register (CSR) reads/writes, including inserting CSR contents into reassembled packets. One use of CSR operations is in conjunction with queue moving, where the meta-packet placed at the end of a queue automatically issues CSR operations that disable or move the queue once all data in the queue (up to the meta-packet) is flushed.

For example, one of the meta-packets X2-X5 may contain the meta-command 136 that causes the queuing processor 18 to issue the CSR command 151 which then reconfigures the queues 122 for operating with a different output destination. This relieves the PPE 134 from having to monitor and perform the reconfiguration operation.

In another application, the queuing processor 18 can be used to repeatedly read performance counters that are contained in CSR registers. For example, the CSR command 136 conducts a CSR read that returns values for the performance counters. The performance counter values are then inserted into the assembled packet that is generated by the meta-packet. The assembled packet containing the performance counter results can then be sent to a processor for further processing, either by re-enqueuing the assembled packet to a different queue, or by other means such as sending the packet to an output interface used for control information.

Re-enqueuing and Meta-Packet Branching

Figure 5:
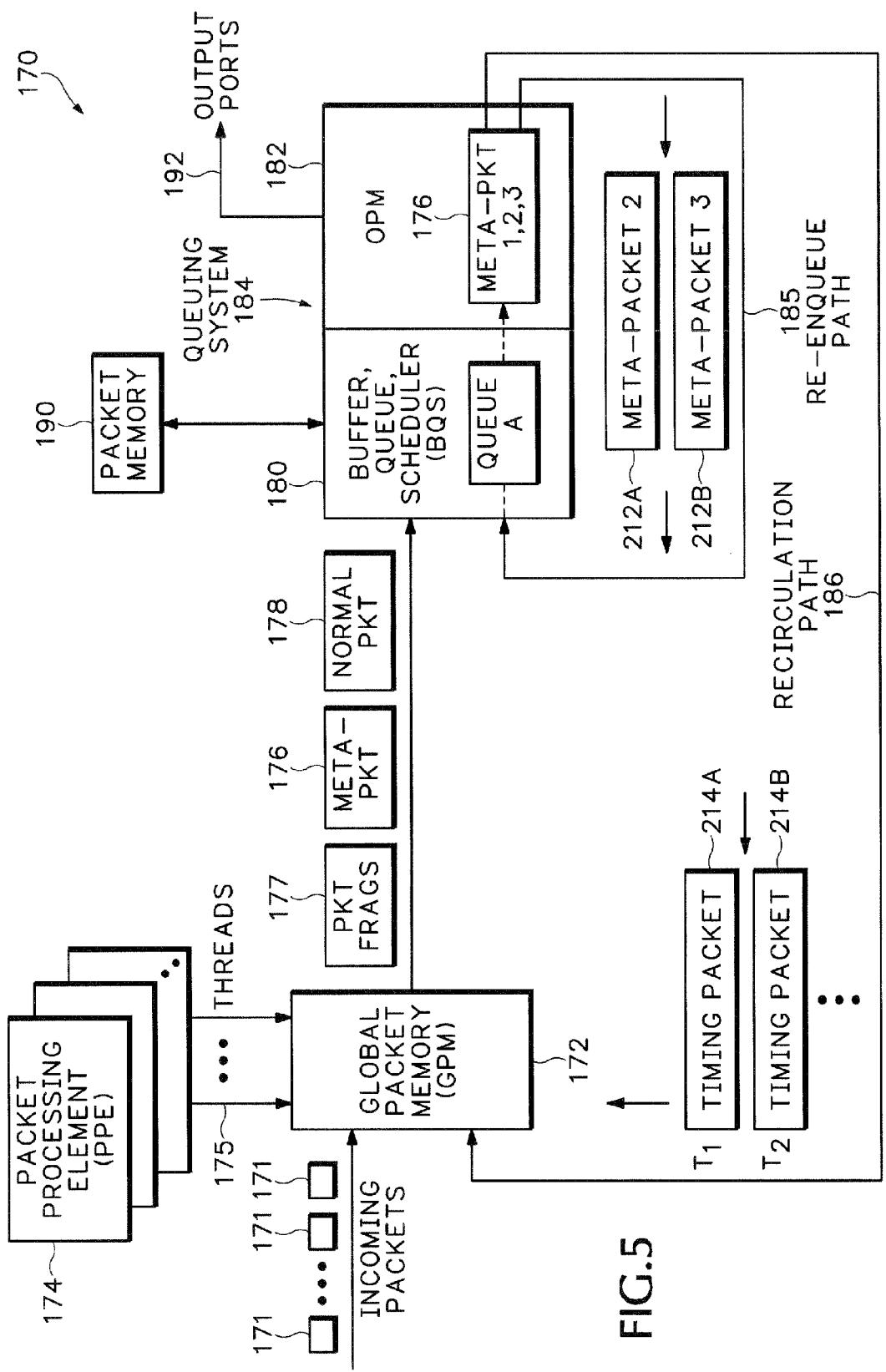
FIG. 5 is diagram showing how the meta-packets re-queue packets to provide a timing reference.

Referring to FIG. 5, the meta-packets can be used for multiple different re-enqueuing and branching operations, in addition to the re-enqueuing example, described above in FIG. 4. FIG. 5 shows one implementation of a packet processor 170 that includes multiple packet processing elements (PPEs) 174 that each operate multiple different threads 175. Incoming packets 171 are received from a packet network and then stored in a Global Packet Memory (GPM) 172.

The packets 171 either before or after being processed by the PPEs 174 may be sent to a queuing system 184 that performs the meta-packet operations described above. The queuing system 184 includes a Buffer, Queue, Scheduler (BQS) 180 that queues the packets 177, 178 and 176 and an Output Packet Module (OPM) 182 that processes the packets queued in the BQS 180. The incoming packets 171 are processed by the PPEs 174 creating outgoing packets 176, 177, and 178 in the GPM 172. The GPM 172 then forwards the outgoing packets 176, 177, and 178 to the queuing system 184.

The OPM 182 may provide some or all of the same operations provided by the queuing processor 18 described above in FIGS. 1-4. In addition to containing packet buffers, the BQS 180 can access packets in a packet buffer memory 190.

The queuing system 184 provides re-enqueuing path 185 from the OPM 182 back to the BQS 180 and also provides a recirculation path 186 from the OPM 182 back to the GPM 172. These re-enqueue path 185 and recirculation path 186 can be used in conjunction with the meta-packets for providing additional packet processing operations. In one example, the meta-packets are used to provide timing information to the PPEs 174.

For example, the PPEs 174 may need to track some relative time period for determining when to drop packets, such as packet 1 as described above in FIG. 3. The PPEs 174 can generate a meta-packet 176 that can then be used to initiate a time-stamp generation process. The generated time stamps are then used for initiating different packet processing operations. In this example, one of the PPEs 174 generates a meta-packet 176 that is sent to the queuing system 25 in the same manner as other normal packets 178 and packet fragments 177 that may contain data or control information. The meta-packet 176 is queued in the BQS 180 along with the other normal packets 178 and packet fragments 177 and eventually de-queued by the OPM 182. The meta-commands contained in meta-packet 176 are described in more detail in FIG. 6.

The meta-packet 176 can create multiple reassembled packets by using End Of Packet (EOP) markers. The meta-packet 176 can also independently control the destination of the different reassembled packet. While the default is to have the reassembled packet replace the meta-packet in a data stream, some reassembled packets may be re-enqueued in queuing system 25 as described above in FIG. 4. In another embodiment shown in FIG. 5, one of the reassembled packets is another meta-packet that is used to repeatedly generate timing packets.

Figure 6:
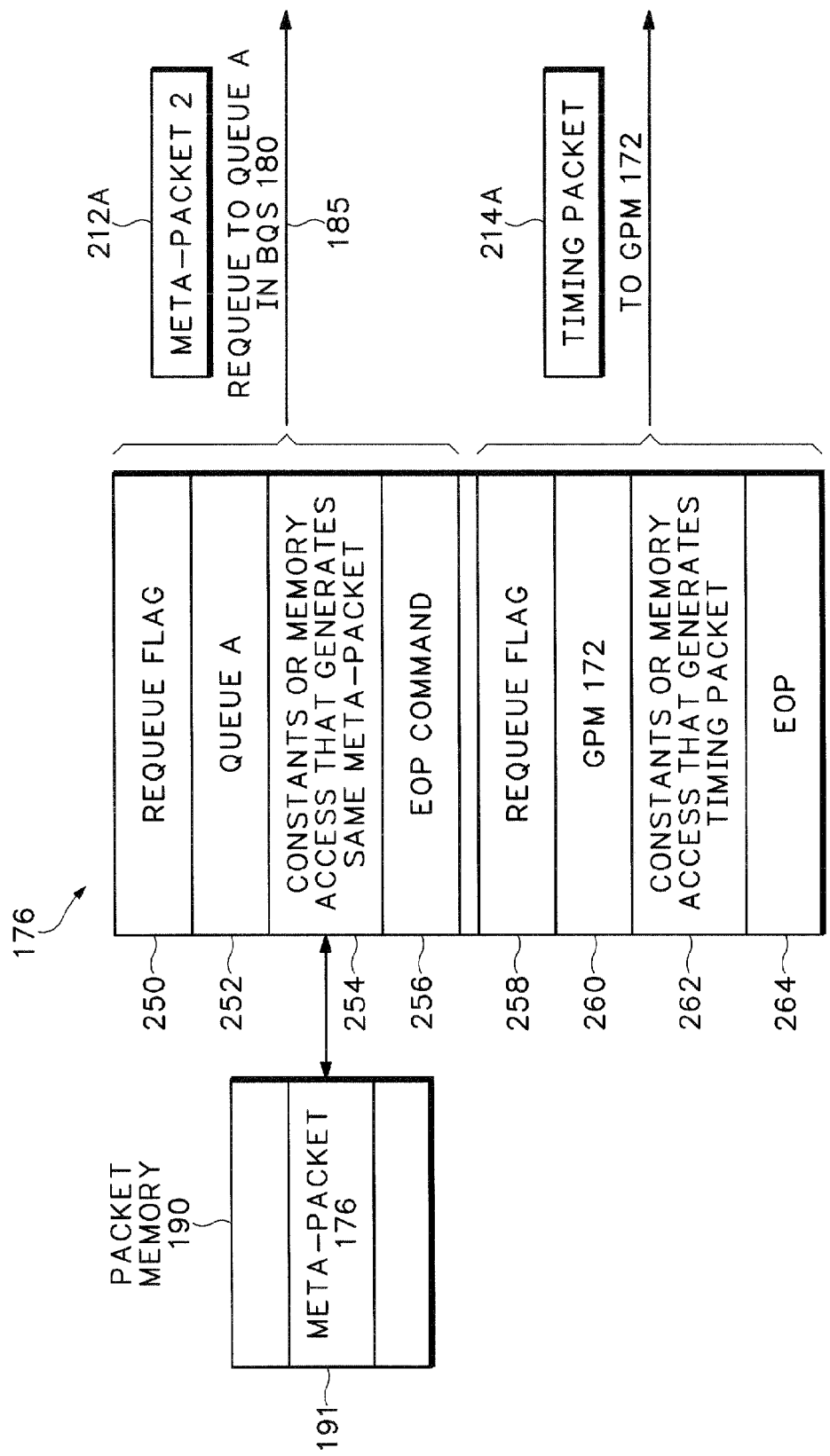
FIG. 6 is another example of a meta-packet used for both regenerating additional meta-packets and for branching off a timing reference packet.

Referring both to FIGS. 5 and 6, the meta-packet 176 includes a first re-enqueue meta-command 250 that directs that OPM 182 to re-enqueue a resulting packet generated from subsequent meta-commands 254 to the BQS 180. The next meta-command 252 then identifies a queue A in the BQS 180 for re-enqueuing the resulting packet. The next meta-command 254 generates another meta-packet 212A that is essentially the same as meta-packet 176.

The meta-command 254 may be any combination of constant values and memory insert commands that reassemble meta-packet 212A. For example, the meta-command 254 may include a memory insert instruction for address location 191 in memory 190. Address 191 may contain the same meta-packet 176. Meta-command 254 is followed by a End-Of-Packet (EOP) meta-command 256 that causes the OPM 182 to re-enqueue the meta-packet 212A in queue A.

In another embodiment, the quote meta-command 67 shown in FIG. 2 is used for generating meta-packet 212A. For example, the quote command can simply direct the OPM 182 to copy the meta-commands 250-264 into meta-packet 212A.

The OPM 182 then continues processing the additional meta-commands 258-264. The meta-commands 258 and 260 instruct the OPM 182 to re-enqueue a second subsequently assembled packet 214A in the GPM 172. The meta-commands 262 are then used to generate the timing packet 214A. The contents of the timing packet 214A can again be generated using any combination of meta-command constants, accesses to memory 190, or accesses to queues in the BQS 180. The timing packet 214A is then re-enqueued to the GPM 172 when EOP command 264 is detected by OPM 182. In another embodiment, queue A might be connected by the recirculation path 186 to the GPM 172, so that timing packet 214A does not have to be re-enqueued. Instead, timing packet 214A would naturally go to GPM 172, as would the meta-packet 212A if not for the re-enqueue associated with it.

FIG. 5 shows the results of OPM 182 re-enqueuing meta-packet 212A and timing packet 214A. The timing packet 214A is output from OPM 182 over the recirculation path 186 to the GPM 172. This timing packet 214A is used by one or more of the PPEs 174 as a time stamp reference for performing timing based operations. For example, timing packet 214A may be associated with a time T1.

The meta-packet 212A is then processed in the queuing system 25 in the same manner as the first meta-packet 176. Specifically, meta-packet 212A generates yet another meta-packet 212B that contains the same meta-commands as meta-packet 176 and 212A. Meta-packet 212A also generates another timing packet 214B that is sent via OPM 182 to the GPM 172. The second timing packet 214B can then be used as a second timestamp value T2.

The meta-packets 212A and 212B are sent to a control queue A that has some relatively quick and repeatable time interval while passing through the BQS 180 and OPM 182. This allows the timing packets 214A and 214B to be generated at a relatively repeatable periodic time interval. In another embodiment, the meta-packet 176 may contain commands that assemble packets that also branch to output ports through path 192. Thus, the same meta-packet 176 can generate different packets that branch to re-enqueue operations in BQS 180, GPM 172, and to the output ports.

The meta-packets can contain any type of instructions, such as encryption/decryption, hashing, and data integrity checking commands, and are not limited to simply moving data. The meta-packets can also be sent to their own queues in the queuing system, rather than being freely inter-mixed with normal packets in the packet queues. Thus, the meta-packets provide packet processing operations that are executed more efficiently and more flexibly than current processing techniques.

These operations include the ability to easily reassemble packets from fragments with low overhead and provide "markers" that indicate when packet transmission has reached certain watermarks, such as when a queue is drained. The meta-packets can also provide more advanced features, such as triggering other operations, such as a CSR modification, etc., via a packet transmission. Meta-packets provide all this functionality in a relatively efficient fashion, and in a way that also preserves packet ordering.

The system described above can use dedicated processor systems, micro-controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A packet processing system, comprising:
   a first storage buffer configured to store data packets containing headers with address or control fields used for directing transport of the data packets over a packet switched network;
   a second storage buffer configured to store packet fragments, wherein two or more of the packet fragments are combinable as a reassembled data packet that is capable of being transported over the packet switched network;
   a first packet queue configured to store the data packets or packet handles that identify where the data packets are located in the first storage buffer;
   a second packet queue configured to store meta-packets containing embedded sequences of meta-commands that are executable independently of the address and control fields contained in the packet headers and that comprise instructions for reassembling the packet fragments;

a packet scheduler configured to output the data packets stored in the first packet queue together with the meta-packets stored in the second packet queue in a first sequential order corresponding with a same order that the data packets and the meta-packets are each separately stored in the first and second packet queues;

a queuing system configured to process the data packets or packet handles and the meta-packets in the first sequential order received from the packet scheduler, wherein the queuing system is further configured, during processing of the meta-packets, to process the packet fragments stored in the second storage buffer to create the reassembled data packet, wherein the packet fragments are reassembled in a second sequential order identified by the embedded sequences of meta-commands contained in the meta-packets, and wherein the reassembled data packet replaces the meta-packets in the first sequential order; and an output port configured to output the data packets and the reassembled data packet in the first sequential order.

2. The packet processing system according to claim 1 wherein at least some of the packet handles contained in the packet queues point to meta-packets that are then processed next in the first sequential order by the queuing system.

3. The packet processing system according to claim 1 wherein the queuing system processes the meta-commands serially in an order contained in the meta-packets.

4. The packet processing system according to claim 1 wherein one or more of the meta-commands cause the queuing system to identify a length for the reassembled data packet and then include the identified length in the reassembled data packet.

5. The packet processing system according to claim 1 wherein one or more of the meta-commands include a memory insert instruction configured to cause the queuing system to load another meta-packet from memory into the packet queues.

6. The packet processing system according to claim 1 wherein one or more of the meta-commands include copy instructions that copy portions of a first meta-packet into a second different meta-packet.

7. The packet processing system according to claim 1 wherein one or more of the meta-commands cause the queuing system to drop one or more of the packet fragments in the first packet queue.

8. The packet processing system according to claim 7 wherein the one or more of the meta-commands cause the queuing system to generate a report identifying an amount of data dropped in the one or more dropped packet fragments.

9. The packet processing system according to claim 8 wherein the report is returned to a processing or control element as part of the reassembled data packet.

10. The packet processing system according to claim 1 wherein:
the first packet queue is located in the packet scheduler and a feedback path couples an output of the queuing system back to the first packet queue; and
one or more of the meta-commands comprise programmable re-queue commands that, when executed, cause the queuing system to re-enqueue the meta-packets back through the feedback path to the first packet queue.

11. The packet processing system according to claim 10 wherein the re-enqueued meta-packets are output through the feedback path separately from the meta-packets or reassembled data packet output from the output port.

12. The packet processing system according to claim 1 wherein one or more of the meta-commands cause the queuing system to generate multiple packets from the same meta-packet.

13. The packet processing system according to claim 1 wherein one or more of the meta-commands cause the queuing system to copy a portion of one or more of the meta-packets into the reassembled data packet or another meta-packet.

14. The packet processing system according to claim 1 wherein the meta-packets are distinguished from the data packets or packet handles by indicating the meta-packets using out-of-band signaling.

15. The packet processing system according to claim 1 wherein the meta-packets are consumed in the queuing system without being output to the output port.

16. A method, comprising:
receiving a first set of data packets and a second set of data packets in one or more buffers;
queuing the first set of data packets comprising data or control packets (regular packets) in a first packet queue;
creating meta-packets responsive to receiving the second set of data packets, wherein the meta-packets include a packet header and meta-commands for assembling the second set of data packets;
queuing the meta-packets in a second packet queue;
de-queuing the first set of data packets and the meta-packets in a first sequential order corresponding with a same order that the first set of data packets and the meta-packets are each separately stored in the first and second packet queues;
distinguishing the meta-packets from the first set of data packets by a bit in the packet header;
executing the meta-commands in the meta-packets to retrieve the second set of data packets in a second sequential order identified by the meta-commands in the meta-packets;
replacing the meta-packets with the second set of data packets in the first sequential order; and
transferring the first set of data packets and the second set of data packets to an output port in the first sequential order.

17. The method according to claim 16 including processing the first set of data packets and the meta-packets in the first sequential order, wherein the processing comprises transferring the first set of data packets and executing the meta-commands.

18. The method according to claim 17 including:
reassembling the second set of data packets read from memory or from a buffer separate from the first and second packet queues.

19. The method according to claim 16 including:
locating one or more of the meta-packets in the second packet queue, wherein the meta-commands provide a notice indicating all packets in front of the one or more meta-packets in the second packet queue have been flushed.

20. The method according to claim 16 including executing a meta-command in one of the meta-packets that issues a command to a packet processing element of a packet processor.

21. The method according to claim 16 including executing one or more of the meta-commands that re-enqueue results from the meta-commands back to the first or second packet queues.

22. The method according to claim 16 including executing one or more of the meta-commands in the meta-packets that generate one or more regular packets or additional meta-packets.

23. The method according to claim 16 including executing one or more of the meta-commands that copy a portion of one or more of the meta-packets into another packet or meta-packet.

24. The method according to claim 16 including executing one or more of the meta-commands that cause one or more of the data packets to be dropped from the first packet queue.

25. The method according to claim 24 including one or more additional meta-commands that generate a report identifying an amount of data dropped in the one or more data packets.

26. The method according to claim 25 including returning the report to a processing or control element as part of an assembled packet.

27. The method according to claim 16 including:
identifying different portions of different packets received in the one or more buffers;
generating additional meta-packets containing meta-commands that identify which of the one or more buffers contain the different portions and that also identify what order the different portions are stored in the one or more buffers; and
sending the additional meta-packets to a queuing system that then reassembles the different portions into the different packets.

28. The method according to claim 27 including queuing the reassembled packets in the first sequential order previously held by the additional meta-packets.

29. The method according to claim 16 including executing the meta-commands in a same meta-packet that cause multiple different regular packets or meta-packets to be created and output or re-enqueued.

30. A packet processing system, comprising:
one or more packet memory devices configured to receive incoming network packets and packet fragments from a packet switched network, wherein the network packets comprise a packet payload;
one or more packet processing elements configured to generate meta-packets containing meta-instructions for reassembling the packet fragments, wherein the meta-packets do not contain packet payloads; and
a queuing system configured to execute the meta-instructions in the meta-packets, wherein execution of the meta-instructions cause the packet processing system to perform operations comprising:
arranging the network packets together with the meta-packets in a first sequential order;
assembling the packet fragments into reassembled network packets in a second sequential order identified in the meta-instructions; and
replacing the meta-packets with the reassembled network packets in the first sequential order.

31. The packet processing system according to claim 30 including a recirculation path between the queuing system and the one or more packet memory devices used by the queuing system under control of the meta-instructions to send the packets back to the one or more packet memory devices.

32. The packet processing system according to claim 30 wherein the queuing system includes:
queues for storing the network packets and the meta-packets; and
a scheduler for scheduling the queuing of the network packets and the meta-packets, wherein the network packets are transferred according to associated packet handles output by the scheduler.

33. The packet processing system according to claim 32 wherein the meta-packets cause the output packet module to re-enqueue the network packets or the meta-packets in the queuing system.

34. The packet processing system according to claim 30 wherein the network packets and the meta-packets are de-queued sequentially in the queuing system and then processed in a same sequential order.

35. The packet processing system according to claim 30 wherein the operations further comprise outputting the network packets and the reassembled network packets in the first sequential order.

36. The packet processing system according to claim 30 wherein the operations further comprise:
identifying a length of the reassembled network packets; and
inserting the identified length in the reassembled network packets.

37. The packet processing system according to claim 36 wherein the identified length indicates how much data should be read in retrieving the plurality of packet fragments, starting at an identified address location in the one or more packet memory devices.

38. A system, comprising:
means for receiving data packets and packet fragments in one or more buffers;
means for queuing the data packets comprising data or control packets (regular packets) in a first queue;
means for generating meta-packets associated with the packet fragments, wherein the meta-packets comprise a packet header and meta-commands comprising instructions for reassembling the packet fragments into a reassembled packet;
means for queuing the meta-packets in a second queue;
means for de-queuing the data packets and the meta-packets in a first sequential order corresponding with a same order that the data packets and the meta-packets are each separately queued in the first and second queues;
means for distinguishing the meta-packets from the data packets;
means for executing the meta-commands in the meta-packets to retrieve the packet fragments in a second sequential order identified by the meta-commands in the meta-packets;
means for reassembling the packet fragments in the second sequential order to create the reassembled packet;
means for replacing the meta-packets with the reassembled packet in the first sequential order; and
means for transferring the data packets and the reassembled packet in the first sequential order.

39. The system according to claim 38 including means for processing the data packets and the meta-packets in the first sequential order, wherein the processing comprises transferring the data packets and executing the meta-commands.

40. The system according to claim 39, wherein the reassembled packet is transferred in a same position in the first sequential order previously held by the meta-packets.

41. A non-transitory storage media having stored thereon computer executable instructions, wherein the instructions are executable by a system that cause the system to perform operations comprising:
receiving a plurality of data packets and a plurality of packet fragments;
storing the plurality of data packets and the plurality of packet fragments;

creating meta-packets that identify a location of the stored packet fragments;

queuing the plurality of data packets and the meta-packets in one or more packet queues of a packet scheduler in a first sequential order, wherein the meta-packets comprise a packet header and meta-commands for reassembling the plurality of packet fragments into a reassembled packet;

de-queuing the data packets and the meta-packets in the first sequential order;

transferring the de-queued data packets while executing the meta-commands in the meta-packets;

retrieving the plurality of packet fragments;

reassembling the plurality of packet fragments into the reassembled packet in a second sequential order according to the meta-commands; and transferring the reassembled packet and the data packets to an output port in the first sequential order.

42. The non-transitory storage media according to claim 41 wherein the operations further comprise distinguishing the meta-packets from the data packets by a field in the packet header.

43. The non-transitory storage media according to claim 41 wherein the operations further comprise copying instructions into a first meta-packet for generating a second meta-packet identical to the first meta-packet.

44. The non-transitory storage media according to claim 43 wherein copying the instructions comprises repeatedly generating multiple timing packets that operate as a time stamp reference.

* * * * *